United States Patent [19]

Penn et al.

[11] 3,812,408
[45] May 21, 1974

[54] TRASH MASHER MOTOR CONTROL

[75] Inventors: Paul E. Penn; John Waymire, both of Indianapolis, Ind.

[73] Assignee: Dart Control, Inc., Indianapolis, Ind.

[22] Filed: May 14, 1973

[21] Appl. No.: 359,656

[52] U.S. Cl. ............................ 318/282, 318/476
[51] Int. Cl. ............................................ H02p 7/28
[58] Field of Search ........... 318/138, 264, 280, 282, 318/283, 469, 474, 476, 477

[56] References Cited
UNITED STATES PATENTS

| | | | |
|---|---|---|---|
| 3,328,661 | 6/1967 | Grebe | 318/280 X |
| 3,509,441 | 4/1970 | Welsh | 318/280 X |

Primary Examiner—Bernard A. Gilheany
Assistant Examiner—W. E. Duncanson, Jr.
Attorney, Agent, or Firm—Hood & Coffey

[57] ABSTRACT

A system for controlling a direct current reversible motor comprising a Triac for controlling the flow of current through the motor, a gating circuit for providing a forward gating current to the gate of the Triac, a flip-flop for drawing the forward gating current away from the gate when the flip-flop is conductive, a control for rendering the flip-flop conductive, and a slaving circuit for drawing current out of the Triac gate when current flow in the forward direction through the Triac is clocked. The slaving circuit includes a resistor-capacitor network connected between the anode of the Triac and its gate such that a charge is built up on the capacitor by a positive current cycle on the anode when the Triac is non-conductive in the forward direction to be discharged by current flow away from the gate when the subsequent negative cycle appears on the anode. The slaving circuit also includes diodes for directing current flow from the gate during discharge of the capacitor. The control for rendering the flip-flop conductive includes a network for sensing the level of current flowing through the motor and providing a control voltage proportional to the current, the flip-flop being rendered conductive when the control voltage reaches a predetermined level.

8 Claims, 1 Drawing Figure

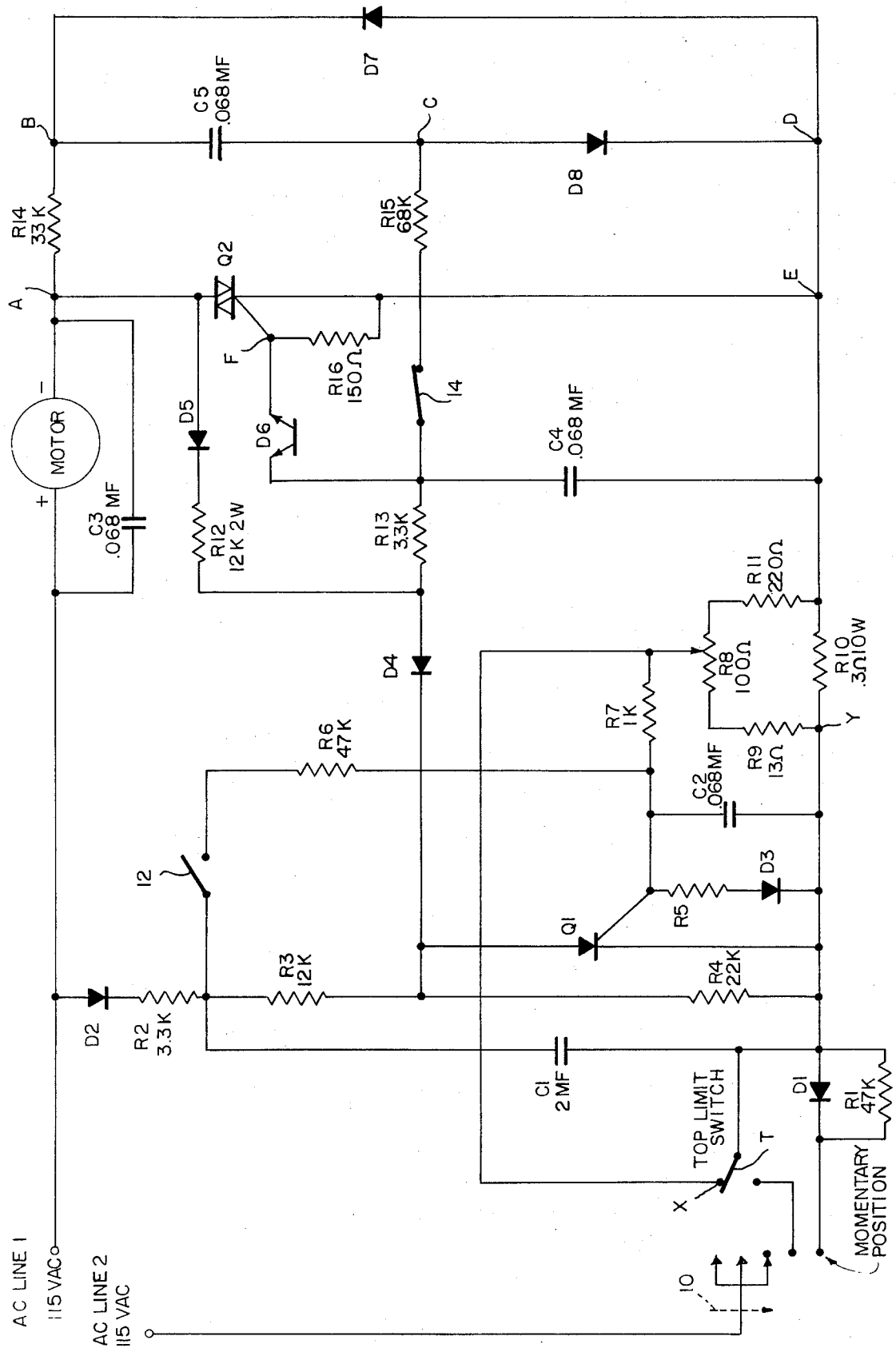

TRASH MASHER MOTOR CONTROL

It is a primary object of our present invention to provide a highly efficient and inexpensive and primarily solid state control system for a direct current reversible motor of the type used in many appliances and apparatus serviced by an alternating current power source. Our system is particularly suitable for use in controlling the motor of a trash masher, but it will be appreciated that our control has many other uses.

Briefly, our invention is a system for controlling a direct current reversible motor, the system comprising first circuit means for connecting one side of the motor to one side of an alternating current power source and second circuit means for connecting the other side of said motor to the other side of the alternating current power source. The second circuit means includes a Triac connected in series between the said other side of the motor and the said other side of the alternating current power source. The Triac is a conventional and commercially available solid state device having a gate control electrode, a first input terminal and a second input terminal. Many persons active in the art refer to the first input terminal as the anode and the second input terminal as the cathode even though the Triac will conduct current in both directions therethrough. Its gate control electrode is effective to render the Triac conductive to pass positive current in a forward direction from the said one side of the power source therethrough when a positive forward gating current is applied to the electrode while a positive cycle is on the said first terminal and to pass current in the opposite direction therethrough when current is drawn out of the electrode while a negative cycle is on the said first terminal. The system further includes a gating circuit for providing a positive forward gating current to the Triac gate electrode, a flip-flop circuit connected across the power source and having alternate conductive and nonconductive states, a control for rendering the flip-flop circuit conductive, third circuit means for connecting the Triac gate electrode to the flip-flop circuit such that the forward gating current is drawn away from the electrode when the flip-flop circuit is conductive, and fourth circuit means for drawing current out of the Triac gate electrode when conduction through the Triac in the forward direction is blocked. The fourth circuit means, which is a slaving circuit as will be discussed hereinafter, includes resistance means and capacitance means connected between the said other side of the motor and the Triac gate electrode such that a change is built up on the capacitance means by a positive current cycle on the said first terminal of the Triac when the Triac is nonconductive in the forward direction to be discharged by current flow away from the electrode when the subsequent negative cycle appears on the said first terminal of the Triac. The said fourth circuit means also includes diode means directing current flow from the gate elecrode of the Triac during discharge of the capacitance means.

Other objects and features of our present invention will become apparent as this description progresses.

To the accomplishment of the above and related objects, this invention may be embodied in the form illustrated in the accompanying drawings, attention being called to the fact, however, that the drawings are illustrative only, and that changes may be made in the specific construction illustrated and described, so long as the scope of the appended claims is not violated.

In the one and only FIGURE of the drawings, we have placed resistor values and capacitor values adjacent the components for convenience in studying the illustrated schematic of our system.

Our illustrated system includes a direct current motor which may be a conventional permanent magnet field motor of the type in which it is necessary only to excite the armature. In parallel with this motor is a 0.068 microfarad capacitor $C_3$ which serves as a noise filter.

When the motor is running in a forward direction, for instance, for compression of trash, current flows from AC line 1 through the motor and the Triac $Q_2$ and out through the 0.3 ohm resistor $R_{10}$ to AC line 2. The gate current necessary to get the Triac to conduct in the forward direction is obtained through the diode $D_5$, 12 kilohm resistor $R_{12}$, 3.3 kilohm resistor $R_{13}$ and Diac $D_6$ to the gate control electrode of the Triac $Q_2$. During this time, a flip-flop composed of SCR $Q_1$ is in the off state. During the start-up for the forward drive, the gate control electrode of SCR $Q_1$ is grounded by the top limit switch T being in the closed position as illustrated. That is, when the switch T is down against its contact X, the gate control electrode of SCR $Q_1$ is grounded through the resistor $R_7$ to the node point Y. When the motor initially starts in the forward direction, the wave form would be big enough to start the SCR $Q_1$ if its gate control electrode were not grounded during that initial starting period.

If the system is not at the home position (top position) when the start button is pushed, the top limit switch T will not be in its grounding position (position X) so that there will be a current applied to the gate control electrode of the SCR $Q_1$ which will cause that flip-flop to set to drive the motor upwardly to the home position (top position). That mechanically will set the top limit switch T in the starting position. Then it is only necessary for the operator to hit the starting switch again to start the compactor motor forwardly (downwardly).

The starting switch is shown at the lower left-hand corner of the schematic. While it is not a part of our invention, the starter switch may be a three-position slider switch movable in the direction indicated by the arrow 10 from its illustrated home position. The first position in the direction of the arrow 10 is the "on" position while the second position in the direction of the arrow 10 is preferably a momentary position held against a spring for a time period sufficient to get the top limit switch T off its contact.

We prefer that the SCR $Q_1$ be a latching SCR of a conventional and commercially available type such that, if sufficient current is on its anode, it will stay conductive once it is turned on by a sufficient signal to its gate control electrode. Sufficient filter current is obtained by a 2 microfarad capacitor $C_1$, diode $D_2$, 3.3 kilohm resistor $R_2$ and 12 kilohm resistor $R_3$. The 22 kilohm resistor $R_4$ adds a discharge and voltage dividing route. In other words, the purpose of the network, including the capacitor $C_1$, diode $D_2$ and resistors $R_2$, $R_3$ and $R_4$ is to keep the SCR $Q_1$ latched once it becomes conductive, and it will stay latched until the latching voltage is removed from its anode. The SCR $Q_1$ will not be unlatched, for instance, until the power is removed from the system or the upper limit switch is reached and the charge on the capacitor $C_1$ is leaked through the resistor network including the resistors $R_3$ and $R_4$.

Thus, the capacitor $C_1$, diode $D_2$ and resistors $R_2$, $R_3$ and $R_4$ form a direct current power supply to supply continuously direct current to the anode of the SCR $Q_1$ to keep the device conductive.

In the normal operating condition, when the system is ready to go, the top limit switch T will be in its home position X grounding the gate circuit for the SCR $Q_1$. That switch, in that normal starting position, also prevents current from coming from the power line AC line 2 through the circuitry to the Triac to flow in the reverse direction. There is a diode $D_4$ connected between the forward gating circuit for the Triac and the anode of the SCR $Q_1$. When the SCR $Q_1$ is conductive, the current used for forward gating is drained through the diode $D_4$ and the SCR $Q_1$ to keep the Triac from being conductive in the forward direction.

Referring now to the right-hand side of the circuitry, it will be seen that we have shown points A, B, C, D, E and F. Point F is the gate control electrode of the Triac. When the point A is positive, i.e., when the first terminal or anode terminal of the Triac is positive, and positive current is pushed into the gate control electrode F, the Triac will be conductive in the forward direction to drive the motor in a forward direction. When we set the SCR $Q_1$ flip-flop, we turn off all of the positive gating current for the Triac through diode $D_5$, resistor $R_{12}$ and resistor $R_{13}$. When point A is negative with respect to point E or with respect to the second terminal of the Triac which is sometimes called its cathode terminal, current drawn out of the electrode point F will cause the current flow through the Triac in the reverse direction to drive the motor in the reverse direction. Point E is thought of as system ground.

At the first time you stop the Triac $Q_2$ from conducting in the forward direction, you build a full voltage (full line voltage) wave form on the point A. That full voltage goes through the 33 kilohm resistor $R_{14}$, point B and the 0.068 microfarad capacitor $C_5$ and diode $D_8$ to ground point D. When that first wave goes back to zero (down the right side to zero), a full charge is trapped upon the capacitor $C_5$ by the diodes $D_7$ and $D_8$. Then, coming through the motor is the negative half of the wave form. All during the time period when the wave form is going negative and through the period when it is a negative wave, the current flow through the capacitor $C_5$ is discharged through the resistor $R_{14}$ in a counterclockwise direction and this current flow must come from the gate control electrode point F through the Diac $D_6$, a reverse lockout switch 14, 68 kilohm resistor $R_{15}$, point C and capacitor $C_5$. When this happens, the Triac is conductive in the negative direction to drive the motor in the reverse direction.

In other words, when the wave form starts going negative on the point A and through the period when it is negative, the charge buildup on capacitor $C_5$ and discharged through the resistor $R_{14}$ must involve current flow and that current flow must come from somewhere. Because of the diode $D_8$, the only place the current flow can come from is the gate control electrode point F through the Diac $D_6$, switch 14 and resistor $R_{15}$.

Diode $D_7$ is a clamping diode which clamps point B to no more than one volt below ground to prevent capacitor $C_5$ from taking a negative charge which would be pushed upon the gate control electrode of the Triac during the next positive going wave form cycle. In other words, diode $D_7$ keeps point B always positive or at least always above ground or no more than one volt below ground.

Since our control system is particularly suited for controlling the motor of a trash masher, one object of our present invention is to shut off the motor in the forward direction (in the compression direction) when the compacting pressure becomes too great. This is done, in our system, by routing all of the current through the resistor $R_{10}$ which is in parallel with a 100 ohm trim pot $R_8$ and resistors $R_9$ and $R_{11}$. The wiper of the trim pot is connected through the resistor $R_7$ to the gate control electrode of the SCR $Q_1$. This trim pot $R_8$ is adjusted to a level such that, when the voltage on the pot becomes approximately 0.7 volt, that will be sufficient to trigger on the SCR $Q_1$ to stop the conduction of the Triac $Q_2$ in the forward direction. Then, the system will automatically reverse because tee Triac is not conducting in the forward direction and can build up the positive wave form on the point A. Such a condition, as just discussed, will start building up the charge on te capacitor $C_5$, which charge will be discharged through the resistor $R_{14}$ as the wave form on the point A starts going negative to draw current out of the gate control electrode of the Triac to cause the motor to run in the reverse direction.

There is a bottom limit switch 12, which is a safety switch, arranged to put a control current on the gate control electrode of the SCR $Q_1$ to stop the system if the pressure sensing device fails to stop it, for instance, if there is nothing to compress.

When the system is being driven forwardly, the circuit to the right of the Triac will be locked out because the wave form will never appear at the point A in the magnitude necessary to put a charge on the capacitor $C_5$.

At this point in the discussion, we emphasize the importance and the advantages of the mode of operation of our slaving circuit including resistors $R_{14}$, $R_{15}$, capacitor $C_5$, and diodes $D_7$, $D_8$. This slaving circuit slaves the Triac control to the point A and the point F automatically to reverse the motor when it stops in the forward direction. This is particularly advantageous for a trash masher.

The reverse lockout switch 14, if opened, will cause the motor to stop and stay where it is. This feature which is a holding feature, is advantageous in a trash masher. The switch 14 may be any commercially available manually operated switch.

The purpose of the Diac $D_6$ is to provide a storage of charge on the capacitor $C_4$ sufficient to gate on the Triac $Q_2$. When diac $D_6$ dumps the charge on capacitor $C_4$, this stored charge produces adequate gate current for the Triac in either desired direction, i.e., a positive or negative charge on the capacitor $C_4$. While we have shown the Diac $D_6$ and capacitor $C_4$ in the gating circuit of a Triac, we have operated the system successfully with a resistor direct current gated Triac, i.e., without Diac $D_6$ and capacitor $C_4$. We presently prefer to use the Diac $D_6$ because it permits us to use higher value resistors $R_{12}$, $R_{13}$, $R_{14}$ and $R_{15}$ to reduce heat losses.

The illustrated resistor $R_{16}$ is a 150 ohm leakage current bleeder commonly used for gate suppression on Triacs and SCR's. The resistor $R_5$ and diode $D_3$ are used to correct the temperature characteristics of SCR $Q_1$. It will be appreciated that, in some cases, the resistor $R_5$ and diode $D_3$ will not be required. The diode $D_1$ prevents the motor from running in a reverse direction when the momentary start switch is held depressed. That is, the diode $D_1$ prevents jamming of the system operated by the motor in the reverse direction by depressing the start switch. Resistor $R_1$ serves as a leakage path in the reverse direction past diode $D_1$ provide small currents to various elements which must have power during the time period the manual start switch is held in the start position.

We claim:

1. A system for controlling a direct current reversible motor comprising first circuit means for connecting one side of said motor to one side of an alternating current power source, second circuit means for connecting the other side of said motor to the other side of said alternating current power source, said second circuit means including a Triac connected in series between said other side of said motor and said other side of said alternating current power source, said Triac having a gate control electrode effective to render said Triac conductive to pass positive current in a forward direction from said one side of said power source therethrough when a positive forward gating current is applied to said electrode while a positive cycle is on said other side of said motor and to pass current in the opposite direction therethrough when current is drawn out of said electrode while a negative cycle is on said other side of said motor, a gating circuit for providing a positive forward gating current to said electrode, a flip-flop circuit connected across said power source and having alternative conductive and nonconductive states, a control for rendering said flip-flop circuit conductive, third circuit means for connecting said electrode to said flip-flop circuit so that the forward gating current is drawn away from said electrode when said flip-flop circuit is conductive, and fourth circuit means for drawing current out of said electrode, said fourth circuit means including resistance means and capacitance means connected between said other side of said motor and said electrode such that a charge is built up on said capacitance means by a positive current cycle on said other side of said motor when said Triac is nonconductive in said forward direction to be discharged by current flow away from said electrode when the subsequent negative cycle appears on said other side of said motor, said fourth circuit means also including diode means directing current flow from said electrode during discharge of said capacitance means.

2. The invention of claim 1 in which said flip-flop circuit includes an SCR having a gate control electrode effective to render said SCR conductive when a gating signal is applied thereto, said control for rendering said flip-flop circuit conductive including means for sensing the level of current flowing through said motor and providing to said SCR control electrode a proportional voltage, said sCR being rendered conductive when said proportional voltage reaches a predetermined level.

3. The invention of claim 2 in which said SCR is of the latching-type such that, once it is rendered conductive, it will remain conductive as long as a positive voltage is applied to its anode.

4. The invention of claim 1 in which said capacitance means and resistance means include a first resistor, capacitor and second resistor connected in series in the order recited between said other side of said motor and said electrode, said diode means including a first diode having its anode connected to the junction between said capacitor and second resistor and its cathode connected to ground, and another diode having its anode connected to ground and its cathode connected to the junction between said first resistor and capacitor.

5. The invention of claim 4 including a Diac connected between said electrode and second resistor and a second capacitor connected between ground and the junction of said Diac and second resistor.

6. The invention of claim 5 in which said third circuit means is connected between said flip-flop circuit and the junction of said Diac and said second capacitor.

7. A system for controlling a direct current reversible motor comprising a Triac for controlling current flow from an alternating current source through said motor, said Triac being connected in series with said motor and having a first input terminal, a second input terminal and a gate control electrode, said electrode being effective to render said Triac conductive to pass positive current in a forward direction through said motor when a positive forward gating current is applied to said electrode while a positive cycle is on said first terminal and to pass current in the opposite direction through said motor when current is drawn out of said electrode while a negative cycle is on said first terminal, a gating circuit for providing a positive forward gating current to said electrode, a flip-flop having alternate conductive and nonconductive states, a control for rendering said flip-flop conductive, said flip-flop being connected to said electrode such that, when said flip-flop is conductive, the forward gating current is drawn away from said electrode, and a slaving circuit for drawing current out of said electrode when forward conduction through said Triac is blocked, said slaving circuit including resistance means and capacitance means connected between said first terminal and said electrode such that a charge is built up on said capacitance means by a positive current cycle on said first terminal when said Triac is nonconductive in said forward direction to be discharged by current flow away from said electrode when the subsequent negative cycle appears on said first terminal, said slaving circuit also including diode means directing current flow from said electrode during discharge of said capacitance means.

8. The invention of claim 7 in which said capacitance means and resistance means includes a first resistor, capacitor and second resistor connected in series in the order recited between said first terminal and said electrode, said diode means including a first diode having its anode connected to the junction between said capacitor and second resistor and its cathode connected to ground and another diode having its anode connected to ground and its cathode connected to the junction between said first resistor and capacitor.

* * * * *